United States Patent [19]

Saeki et al.

[11] Patent Number: 5,082,881

[45] Date of Patent: Jan. 21, 1992

[54] TWO-COMPONENT TYPE ADHESIVE AGENT FOR WOOD

[75] Inventors: Koichiro Saeki; Koji Nagaoka; Ichimoto Akasaki, all of Yokohama, Japan

[73] Assignee: Nippon Shokubai Kagaku Kogyo Co., Ltd, Osaka, Japan

[21] Appl. No.: 603,302

[22] Filed: Oct. 24, 1990

[30] Foreign Application Priority Data

Oct. 27, 1989 [JP] Japan .................................. 1-278528
Aug. 31, 1990 [JP] Japan .................................. 2-228318

[51] Int. Cl.$^5$ ...................... C08L 67/00; C08F 8/00; C08F 220/02; C08G 59/16
[52] U.S. Cl. .................................. 523/511; 525/192; 525/329.9; 525/531
[58] Field of Search ................. 524/510, 114; 525/192, 525/329.9

[56] References Cited

U.S. PATENT DOCUMENTS

| | | | |
|---|---|---|---|
| 3,316,202 | 4/1967 | Abere | 525/329.9 |
| 3,679,621 | 7/1972 | Morf et al. | 525/329.9 |
| 3,931,088 | 10/1976 | Sakarada . | |
| 4,374,963 | 2/1983 | Morgan et al. | 525/486 |

*Primary Examiner*—Joseph L. Schofer
*Assistant Examiner*—Wu C. Cheng
*Attorney, Agent, or Firm*—Burns, Doane, Swecker & Mathis

[57] ABSTRACT

A two-component type adhesive agent, comprising a polyvalentepoxy compound and an aqueous liquid of an amino group-containing polymer obtained by modifying a carboxyl group-containing polymer with an alkylene imine and possessed of an activated hydrogen atom.

13 Claims, No Drawings

TWO-COMPONENT TYPE ADHESIVE AGENT FOR WOOD

BACKGROUND OF THE INVENTION

1. Field of the Invention

This invention relates to a two-component type adhesive agent for wood. Particularly, it relates to a two-component type adhesive agent for wood which comprises a polyvalentepoxy compound and an amino group-containing polymer modified with an alkylene imine and possessed of an activated hydrogen atom. More particularly, it relates to a two-component type adhesive agent for wood which enjoys a long pot life and, on being applied to wood and allowed to closs-link thereon at room temperature, imparts to the wood waterproofness and resistance to the effect of boiling and avoids defiling the wood.

2. Description of the Prior Art

Heretofore, vinyl acetate type emulsions and chloroprene type or styrene-butadiene type latexes have been used as adhesive agents for wood. Other adhesive agents of this class having urea resin or phenol resin incorporated therein for imporovement in waterproofness and resistance to the effect of boiling and adhesive agents of aqueous vinyl urethane produced by dispersion of isocyanate in a polymer emulsion containing an aqueous polyvinyl alcohol solution as disclosed in U.S. Pat. No. 3931088, etc. have been also put to use. Further, mixtures comprising a polymer containing an activated hydrogen atom capable of reacting with an epoxy group, a varying latex, and a compound containing at least two epoxy groups in the molecular unit thereof and mixtures comprising a polyvalentepoxy compound, an emulsion having a hydrazine derivative possessing at least two hydrazine residues dispersed in a polymer emulsion possessing a carboxyl group represented by an aldo group or a keto group, and a polyvinyl alcohol as essential components have been proposed as adhesive agents for wood.

Generally, an adhesive agent for wood by nature is expected to fulfil the following requirements:

(1) It should be capable of allowing required adhesion at room temperature.

(2) It should be capable of closs-linking at room temperature.

(3) It should possess a pot life sufficient from the practical point of view.

(4) It should possess highly satisfactory adhesive properties including adhesive power under normal conditions, waterproofness, thermal stability, and resistance to the effect of boiling.

(5) It should ensure safe use by exhibiting pH in the neutral region and avoiding inclusion of harmful substances such as formalin and organic solvent.

(6) It should possess constitution such that it excels in workability and the adhesive agent adhering to a machine used in application to wood can be easily removed by washing with water.

The aforementioned adhesive agents for wood formed of vinyl acetate type emulsions and chloroprene type or styrene-butadiene type latexes, however, are deficient in waterproofness. The adhesive agents of this class having urea resins or phenol resins additionally incorporated therein for improvement in waterproofness necessitate an extra heating step and prove to be incomplete in the ability to resist the effect of boiling. The adhesive agents formed of aqueous vinyl urethane, though excelling in waterproofness and resistance to the effect of boiling, suffer from conspicuous effervescence and viscosity, offer only an insufficient pot life, and betray a poor workability in the process of application to wood. The adhesive agents for wood formed of a mixture comprising a compound containing an activated hydrogen atom capable of reacting with an epoxy group, a varying latex, and a compound containing at least two epoxy groups in the molecular unit thereof are highly satisfactory in workability but unsatisfactory in resistance to the effect of boiling because they use an adhesive layer which combines a continuous layer of latex and a solidifying system. In the case of the adhesive agents formed of a mixture comprising a polymer emulsion having a hydrazine derivative possessing at least two hydrazine residues dispersed in a polymer emulsion possessing a carboxyl group represented by an aldo group or a keto group, an epoxy compound, and a polyvinyl alcohol as essential components, when hydrazine hydrate and other hydrazine derivative are used, the adhesive agents in the process of storage pose the problem of toxicity due to the free hydrazine formed by hydrolysis of the hydrazine derivative. Further, these adhesive agents are not satisfactory in terms of the ability to resist the effect of boiling.

An object of this invention, therefore, is to provide a novel two-component type adhesive agent for wood.

Another object of this invention is to provide a two-component type adhesive agent for wood which fulfils the requirements expected of an adhesive agent for wood, alleviates the effects of the adverse properties of the conventional wood-grade adhesive agents, enjoys a long shelf life, allows required adhesion at room temperature, produces a solidified adhesive layer excelling in waterproofness and resistance to the effect of boiling, and avoids defiling the wood.

SUMMARY OF THE INVENTION

The objects described above are accomplished by a two-component type adhesive agent for wood, which comprises a polyvalentepoxy compound and an aqueous liquid of an amino group-containing polymer obtained by modifying a carboxyl group-containing polymer with an alkylene imine and possessed of an activated hydrogen atom.

The two-component type adhesive agent for wood according with this invention has an effect of forming an adhesive layer excelling in workability and resistance to the effect of boiling as compared with the adhesive layer of the conventional adhesive agent for wood.

EXPLANATION OF THE PREFERRED EMBODIMENT

The expression "amino group-containing polymer obtained by modifying a carboxyl group-containing polymer with an alkylene imine and possessed of an activated hydrogen atom" as used in the present invention refers to a product obtained by modifying a carboxyl group-containing polymer with an alkylene imine. The term "carboxyl group-containing polymer" specifically refers to a copolymer between at least one carboxyl group-containing monomer and at least one monomer copolymerizable therewith.

The carboxyl group-containing monomers which are usable in this invention include unsaturated monocarboxylic acids such as acrylic acid, methacrylic acid, cinnamic acid, and crotonic acid, unsaturated dicarboxylic acids such as itaconic acid, maleic acid, and fumaric acid, and monoesters thereof, for example. The monomers which are copolymerizable with such carboxyl group-containing monomers include (meth)acrylamides, N-methylol (meth)acrylamides, 2-hydroxyethyl (meth)acrylates, 2-hydroxypropyl (meth)acrylates, ethyl (meth)acrylates, n-propyl (meth)acrylates, isopropyl (meth)acrylates, n-butyl (meth)acrylates, isobutyl (meth)acrylates, t-butyl (meth)acrylates, 2-ethylhexyl (meth)acrylates, cyclohexyl (meth)acrylates, stearyl (meth)acrylates, lauryl (meth)acrylates, (meth)acrylonitriles, styrene, α-methyl styrene, vinyl acetate, vinyl propionate, (meth)acroleins, dimethylaminoethyl (meth)acrylates, diethylaminoethyl (meth)acrylates, butadiene, ethylene, and propylene, for example. The carboxyl group-containing polymers are generally in the form of aqueous liquids such as emulsions and suspensions and aqueous solutions, preferably in the form of emulsions.

Such a carboxyl group-containing polymer is obtained by subjecting the aforementioned monomers to emulsion polymerization or suspension polymerization in water containing an emulsifier or a dispersant in the presence of a polymerization initiator or subjecting the monomers to solution polymerization in an aqueous solvent. The polymerization initiators which are usable herein include hydrogen peroxide, ammonium persulfate, potassium persulfate, and 2,2'-azobis(2-aminodipropane) hydrochloride (produced by Wako Junyaku K. K. and marketed under product code of "V-50"), for example. Further, the redox type initiators which are obtained by combining these polymerization initiators with sodium hydrogen sulfite, L-ascorbic usable acid, and ferrous salts, for example, are similarly Such a polymerization initiator is generally used in an amount in the range of 0.1 to 6 % by weight, preferably 0.2 to 3 % by weight, based on the combined amount of the monomers. The substances whioh are usable as the emulsifier or dispersant include anionic surfactants such as alkyl(-polyoxyethylene) sulfates, alkane sulfonates, dialkyl 2-sulfosuccinates, alkylbenzene sulfonates, and formalin condensates of naphthalenesulfonic acid and/or nonionic surfactants such as alkylphenyl polyoxyethylene ethers (P 20 to 50) (wherein P is the average polymerization degree of ethylene oxide), for example, and they are used in the range of 0.1 to 15 % by weight, preferably 0.5 to 6 % by weight based on the total of the monomers.

Where the carboxyl group-containing polymer obtained by solution polymerization is not a water-soluble polymer, it may be converted into a water-soluble polymer by neutralization with a basic substance. The basic substances which are usable for the neutralization include amine compounds such as ammonia, trimethyl amine, triethyl amine, and monoethanol amine and inorganic basic compounds such as sodium hydroxide and potassium hydroxide, for example. Carboxyl group-containing polyvinyl alcohols, lignin, and rosin ar other carboxyl group-containing polymers.

These carboxyl group-containing polymers are commercially produced as carboxyl group-containing acrylic type emulsions, carboxyl group-containing styrene-acryl type emulsions, carboxyl group-containing vinyl acetate type emulsions, carboxyl group-containing vinyl acetate-ethylene type emulsions, carboxyl group-containing SBR type latexes, and carboxyl group-containing butadiene-acrylonitrile type latexes, for example. The content of the carboxyl group (—COOH) in the polymer is required to exceed 2% by weight and desired to be in the range of 2.5 to 15% by weight as monomer.

The carboxyl group-containing polymer, in the process of the emulsion polymerization, may have the polymer interior thereof cross-linked in advance with a monomer possessing at least two copolymerizable unsaturated moieties in the molecular unit thereof. The cross-linking monomers which are usable herein include divinyl benzene, trimethylol propane di(meth)acrylates, pentaerythritol di(meth)acrylates, trimethylol propane tri(meth)acrylates, pentaerythritol tri(meth)acrylates, (poly)ethylene glycol di(meth)acrylates, (poly)propylene glycol di(meth)acrylates, glycerol tri(meth)acrylates, glycerol di(meth)acrylates, N,N'-methylenebis(-meth)acrylamides, triallyl cyanurate, triallyl isocyanurate, triallyl amine, and triallyl phosphates, for example. These cross-linking monomers may be used either singly or in the form of a combination of at least two members. Such a cross-linking monomer is used in an amount in the range of 0.05 to 1 % by weight, preferably 0.1 to 0.5 % by weight, based on the combined amount of the monomers. Otherwise, the emulsion may have the polymerization degree thereof controlled with a chain transfer agent such as t-dodecyl mercaptan in an emulsion polymerization or the emulsion may be an emulsion of multilayer (core-shell type) particles obtained by sequentially polymerizing at least two mixtures of monomers or may be a product of emulsion polymerization effected by such a known method as the power feed method, for example.

The expression "amino group-containing polymer modified with an alkylene imine and possessed of an activated hydrogen atom" which is one of the essential components for the adhesive agent of this invention refers to what is obtained by modifying the aforementioned carboxyl group-containing polymer with an alkylene imine. The alkylene imines which are usable for this modification include ethylene imine, propylene imine, and butylene imine, for example. N-(2-aminoalkyl)-substituted alkylene imines such as N-(2-aminoethyl)aziridine, N-(2-aminopropyl)aziridine, and N-(2-aminoethyl)propylene imine are similarly usable. Among other alkylene imines mentioned above, ethylene imine and propylene imine prove to be particularly preferable.

The amount of such an alkylene imine to be used for the modification is in the range of 0.2 to 2.5 mols, preferably 0.5 to 1.5 mols, per mol of the carboxyl group of the carboxyl group-containing polymer.

The modification of a carboxyl group-containing polymer with an alkylene imine is accomplished by combining an aqueous liquid such as, for example, an emulsion, a suspension, or an aqueous solution of the polymer with the alkylene imine and an aqueous solution of the alkylene imine and simultaneously heating at a temperature of 2° to 60° C., preferably 10° to 50° C., and then stirring the resultant reaction mixture for reaction at a temperature in the range of 35° to 80° C., preferably 40° to 60° C., for a period in the range of 0.5 to 8 hours, preferably 1 to 5 hours. The number average molecular weight of the amino group-containing polymer obtained as described above and possessing an activated hydrogen atom is required to exess 10,000, preferably excess 100,000.

The polyvalentepoxy compounds which are usable as the other essential component of the adhesive agent of this invention include polyglycidyl ethers obtained by the reaction of polyphenols such as bisphenol A, halogenated bisphenol A's, bisphenol F, catechol, novolak, and resorcinol, and polyhydric alcohols such as alkylene glycols, glycerol, trimethylol propane, and pentaerythritol with epichlorohydrin in the presence of a basic catalyst, and the epoxy compounds such as epoxized olefins, for example, epoxidized polybutadiene, dicyclopentadiene oxide, and epoxidized vegetable oils obtained by epoxidization effected by the method of peroxidization.

These epoxy compounds may be used either singly or in the form of a mixture of at least two members. The polyvalentepoxy compound as one of the components of the adhesive agent is mixed with the other components in its unmodified form or in a form dissolved or dispersed in an organic solvent or water. The amount of the polyvalent epoxy compound to be used is such that the ratio of the equivalent weight of epoxy to the equivalent weight of amine hydrogen in the amino group-containing polymer (epoxy equivalent weight ratio) falls in the range of 0.5 to 6.0, preferably 0.75 to 4.0. If the polyvalentepoxy compound to be used has an epoxy equivalent weight ratio of less than 0.5, no sufficient improvement is obtained in waterproofness or thermal stability. Conversely, if it has an epoxy equivalent weight ratio exceeding 6.0, the produced adhesive agent has only a short pot life and suffers waterproofness and other properties to decline under the influence of the unaltered polyvalentepoxy compound remaining therein.

The adhesive agent of this invention may suitably incorporate therein, in addition to the components described above, any of various additives such as, for example, film-forming auxiliaries like plasticizers and high-boiling solvents, extenders like wheat flour, starch, and corn starch, fillers like clay, talc, calcium carbonate, titanium dioxide, iron oxide red, and bentonite, natural polymeric substances represented by cellulose derivatives like methyl cellulose, hydroxyethyl cellulose, and CMC, synthetic polymeric substances like polyvinyl alcohol and polyvinyl alcohol derivatives, and functional preparations like viscosity enhancer, antiseptic, insecticide, and defoaming agent. Now, the method for the production of the two-component type adhesive agent for wood according with this invention and the specific method for the evaluation of the properties of the adhesive agent will be described below with reference to working examples. It should be noted, however, that this invention is not limited in any sense by these examples. The word "parts" as used in the working examples refers to "parts by weight."

REFERENTIAL EXAMPLE 1

In a separable flask having an inner volume of 1 liter and provided with a stirrer, a reflux condenser, a thermometer, and a nitrogen inlet tube, 398 parts of deionized water and 40 parts of an anionic surfactant (aqueous 25 wt% solution) were placed and nitrogen was introduced for displacement and, at the same time, the inner temperature was elevated to 68° C. The contents of the flask and 40 parts of a polymerizable monomer mixture comprising 48 parts of acrylic acid, 160 parts of 2-ethylhexyl acrylate, and 192 parts of styrene were combined and stirred for 15 minutes. Then, the resultant reaction mixture was set polymerizing by the addition thereto of 4.6 parts of an aqueous 1.75 wt% hydrogen peroxide solution and 4.2 parts of an aqueous 3 wt% L-ascorbic acid. On elapse of 15 minutes after the start of the polymerization, the remaining polymerizable monomer mixture was uniformly added dropwise over a period of 90 minutes. In the meantime, 41 parts of an aqueous 1.75 wt% hydrogen peroxide solution and 37 parts of an aqueous 3 wt% L-ascorbic acid solution were added dropwise to the flask portionwise at intervals of 10 minutes until completion of the dropwise addition of the polymeric monomer mixture. After the completion of the dropwise addition, the resultant polymerization mixture was left aging for 1 hour and cooled, to give rise to an emulsion having an involatile content of 44.5% by weight. Then, 150 parts of this emulsion and 40.6 parts of deionized water were uniformly mixed and the resultant mixture and 47.8 parts of an aqueous 10 wt% ethylene imine solution added thereto in a stirred state were left reacting at 50° C. for 2 hours. Consequently, there was obtained an aminoethyl group-containing polymer emulsion having a nonvolatile content of 30% by weight.

REFERENTIAL EXAMPLES 2 to 4

Emulsion polymerization was carried out by following the procedure of Referential Example 1, except that copolymerizable monomer mixtures varying in composition as indicated in Table 1 were used instead. Further, by following the procedure of Referential Example 1, aminoethyl group-containing polymer emulsions were produced by the use of ethylene imine.

TABLE 1

|  | Composition of copolymerizable monomer mixture (parts) Referential Example | | |
|---|---|---|---|
|  | 2 | 3 | 4 |
| Acrylic acid | 48 | 48 | 48 |
| Styrene | 138 | 138 | 184 |
| Methyl methacrylate | 57 | 57 | 57 |
| Butyl acrylate | 157 | 157 | 111 |
| Divinyl benzene (55%) |  | 1.8 |  |

REFERENTIAL EXAMPLE 5

In the same flask as used in Referential Example 1, 398 parts of deionized water and 40 parts of an anionic surfactant (aqueous 25 wt% solution) were placed and nitrogen gas was introduced for displacement and, at the same time, the inner temperature was elevated to 68° C. The contents of the flask and 40 parts of a polymerizable monomer mixture comprising 8 parts of acrylic acid, 92 parts of styrene, 29 parts of methyl methacrylate, and 55 parts of butyl acrylate added thereto were stirred for 15 minutes. The resultant reaction mixture was set polymerizing by the addition thereto of 4.6 parts of an aqueous 1.75 wt% hydrogen peroxide solution and 4.2 parts of an aqueous 4.6 wt% L-ascorbic acid solution. On elapse of 15 minutes after the start of the polymerization, the remaining polymerizable monomer mixture was uniformly added dropwise over a period of 40 minutes. In the meantime, 16.4 parts of an aqueous 1.75 wt% hydrogen peroxide solution and 14.8 parts of an aqueous 3 wt% L-ascorbic acid solution were added dropwise to the flask portionwise at intervals of 10 minutes until the completion of the dropwise addition of the polymerizable monomer mixture. After the completion of the dropwise addition, the resultant polymerization mixture was left aging for 30 minutes. Then, a polymerizable monomer mixture comprising 40 parts of acrylic acid, 69 parts of styrene, 29 parts of methyl methacrylate, and 78 parts of butyl acrylate was uniformly added dropwise over a period of 50 minutes. In the meantime, 24.6 parts of an aqueous 1.75 wt% hydrogen peroxide solution and 22.2 parts of an aqueous 3 wt% L-ascorbic acid solution were added dropwise to the flask portionwise at intervals of 10 minutes until completion of the dropwise addition of the polymerizable monomer mixture. After the completion of the dropwise addition, the resultant mixture was left aging for 1 hour and cooled, to give rise to an emulsion having an nonvolatile content of 44.5% by weight. From this emulsion, an aminoethyl group-containing polymer emulsion was produced by following the procedure of Referential Example 1.

REFERENTIAL EXAMPLE 6

A mixture of 150 parts of a carboxyl group-modified styrene-butadiene latex having a nonvolatile content of 50.0% by weight with 17 parts of 0.5N HNO3 and 23 parts of an aqueous 10 wt% ethylene imine solution added thereto were left reacting at 50° C. for 2 hours and then were cooled, to give rise to an aminoethyl group-containing styrene-butadiene copolymer latex having an nonvolative content of 40.7% by weight.

EXAMPLE 1

An adhesive agent having a nonvolatile content of 28.8% by weight was obtained by uniformly mixing 100 parts of the aminoethyl group-containing polymer emulsion obtained in Referential Example 1 with 20 parts of an aqueous solution of 2% by weight of CMC (sodium cellulose glycolate) whose 1 wt% aqueous solution exhibits a viscosity of 10,000 cps at 25° C. and 5.8 parts of ethylene glycol diglycidyl ether.

Two matched test pieces of birch were pressed against each other through the medium of the adhesive agent applied at a rate of 150 g/m² to the opposed surfaces of the test pieces and were joined by clamping under the conditions of 25° C. of temperature, 10 kg/cm² of clamping pressure, and 1 hour of clamping time. The interposed layer of the adhesive agent was left aging at 25° C. and 60% RH for 3 days and then tested for adhesive power under normal conditions and adhesive power retained after repeated boiling treatments, both determined in terms of compressive shear strength (kg.f/cm²), in accordance with the method of Japanese Industrial Standard (JIS) K-6852, with necessary modifications. The results are shown in Table 3.

EXAMPLES 2 TO 14

Adhesive agents of varying compositions indicated in Table 2 were produced by following the procedure of Example 1, except that the aminoethyl group-containing polymer emulsions obtained in Referential Examples 1 to 5 were used instead. These adhesive agents were used to join matched test pieces of birch. The interposed layers of the adhesive agents were tested for adhesive power in the same manner as in Example 1. The results are shown in Table 3.

CONTROL 1

A polyvinyl acetate emulsion having a nonvolatile content of 40% by weight was prepared herein.

An experiment was performed by following the procedure of Example 1, except that the polyvinyl acetate emulsion was used instead. The results are shown in Table 3.

CONTROL 2

A two-component type aqueous vinyl urethane type adhesive agent exhibiting a nonvolatile content of 46.8% by weight in the state prepared for use was prepared herein.

An experiment was performed by following the procedure of Example 1, except that this adhesive agent was used instead. The results are shown in Table 3.

CONTROL 3

An adhesive agent having a nonvolatile content of 29% by weight was obtained by uniformly mixing 100 parts of a hydrazine-modified acrylic polymer emulsion having a nonvolatile content of 47% by weight (produced by Yuka-Badische and marketed under trademark designation of "Acronal YJ-2730D") with 10 parts of an aqueous solution of 10 wt% of partially saponified polyvinyl alcohol whose 4 wt% aqueous solution exhibits a viscosity of 56 cps at 20° C., and 1.5 parts of ethylene glycol diglycidyl ether.

An experiment was performed by following the procedure of Example 1, except that this adhesive agent was used instead. The results are shown in Table 3.

TABLE 2

| | | Example 2 | Example 3 | Example 4 | Example 5 | Example 6 | Example 7 | Example 8 |
|---|---|---|---|---|---|---|---|---|
| | Amino group-containing polymer | R.E. 1 100 | R.E. 1 100 | R.E. 2 100 | R.E. 1 100 | R.E. 1 100 | R.E. 3 100 | R.E. 4 100 |
| Additive | Aqueous solution of 2 wt % of CMC whose 1 wt % aqueous solution exhibits a viscosity of 10,000 cps at 25° C. | | | 20 | | | 20 | 20 |
| | Aqueous solution of 15 wt % of partially saponified polyvinyl alcohol whose 4 wt % aqueous solution exhibits a viscosity of 56 cps at 20° C. | 21.5 | 21.5 | | | 21.5 | | |
| | 2,2,4-Trimethyl-1,3-pentane diol monoisobutyrate | | | | | | | 1.2 |
| Filler | Calcium carbonate | | 3 | | | | | |
| Cross-linking agent | Ethylene glycol diglycidyl ether | 5.8 | 5.8 | 5.8 | | | 5.8 | 5.8 |
| | Sorbitol polyglycidyl ether | | | | 8.3 | 8.3 | | |
| | Trimethylol propane poltyglycidyl ether | | | | | | | |
| | Glycerol polyglycidyl ether | | | | | | | |
| | Involatile content (% by weight) | 30.7 | 32.7 | 28.8 | 30.1 | 32 | 28.8 | 29.4 |

| | | Example 9 | Example 10 | Example 11 | Example 12 | Example 13 | Example 14 |
|---|---|---|---|---|---|---|---|
| | Amino group-containing polymer | R.E. 4 100 | R.E. 4 100 | R.E. 4 100 | R.E. 4 100 | R.E. 5 100 | R.E. 6 100 |
| Additive | Aqueous solution of 2 wt % of CMC whose 1 wt % aqueous solution exhibits | | 20 | | 20 | 20 | 20 |

TABLE 2-continued

|  |  | | | | | | |
|---|---|---|---|---|---|---|---|
|  | a viscosity of 10,000 cps at 25° C. Aqueous solution of 15 wt % of partially saponified polyvinyl alcohol whose 4 wt % aqueous solution exhibits a viscosity of 56 cps at 20° C. | | | | | | |
|  | 2,2,4-Trimethyl-1,3-pentane diol monoisobutyrate |  |  | 1.2 | 1.2 |  |  |
| Filler | Calcium carbonate | | | | | | |
| Cross-linking agent | Ethylene glycol diglycidyl ether |  |  |  |  |  | 3.3 |
|  | Sorbitol polyglycidyl ether | | | | | | |
|  | Trimethylol propane poltyglycidyl ether | 5.8 | 5.8 |  |  |  |  |
|  | Glycerol polyglycidyl ether |  |  | 7.0 | 7.0 | 7.0 |  |
|  | Involatile content (% by weight) | 33.8 | 28.8 | 35.3 | 30.1 | 29.4 | 36 |

R.E.: Referential Example

TABLE 3

|  | Pot life (hours) | Compressive shear strength (kgf/cm²) | |
|---|---|---|---|
|  |  | Normal conditions | After repeated boiling treatment |
| Example 1 | 6< | 96 | 60 |
| Example 2 | 6< | 102 | 55 |
| Example 3 | 6< | 120 | 65 |
| Example 4 | 6< | 108 | 52 |
| Example 5 | 6< | 100 | 60 |
| Example 6 | 6< | 110 | 64 |
| Example 7 | 6< | 130 | 56 |
| Example 8 | 6< | 115 | 50 |
| Example 9 | 6< | 110 | 75 |
| Example 10 | 6< | 118 | 70 |
| Example 11 | 6< | 115 | 72 |
| Example 12 | 6< | 120 | 65 |
| Example 13 | 6< | 114 | 60 |
| Example 14 | 6< | 96 | 53 |
| Control 1 | — | 133 | 0 |
| Control 2 | 1> | 100 | 57 |
| Control 3 | 6< | 105 | 32 |

What is claimed is:

1. A two-component type adhesive agent, comprising a polyvalentepoxy compound and an aqueous liquid of an amino group-containing polymer obtained by modifying a carboxyl group-containing polymer with an alkylene imine and possessed of an activated hydrogen atom.

2. An adhesive agent according to claim 1, wherein the amount of said polyvalentepoxy compound is such that the ratio of the equivalent weight of epoxy to the equivalent weight of amine hydrogen of said amino group-containing polymer (equivalent weight of epoxy/equivalent weight of amine hydrogen) is in the range of 0.5 to 6.0.

3. An adhesive agent according to claim 2, wherein the amount of said alkylene imine used for modification is in the range of 0.2 to 2.5 mols per mol of the carboxyl group of said carboxyl group-containing polymer.

4. An adhesive agent according to claim 3, wherein said alkylene imine is ethylene imine or propylene imine.

5. An adhesive agent according to claim 1, wherein the amount of the carboxyl group in said carboxyl group-containing polymer is not less than 2% by weight as monomer.

6. An adhesive agent according to claim 1, wherein said aqueous liquid is an emulsion or an aqueous solution of an amino group-containing polymer.

7. An adhesive agent according to claim 1, wherein the amount of said polyvalentepoxy compound is such that the ratio of the equivalent weight of epoxy to the equivalent weight of amine hydrogen of said amino group-containing polymer (equivalent weight of epoxy/equivalent weight of amine hydrogen) is in the range of 0.75 to 4.0.

8. An adhesive agent according to claim 5, wherein said carboxyl group-containing polymer is a copolymer between a carboxyl group-containing monomer and other copolymerizable monomer.

9. An adhesive agent according to claim 8, wherein said carboxyl group-containing monomer is one member selected from the group consisting of unsaturated monocarboxylic acids, unsaturated dicarboxylic acids, and monoesters thereof.

10. An adhesive agent according to claim 9, wherein said carboxyl group-containing monomer is an unsaturated monocarboxylic acid.

11. An adhesive agent according to claim 10, wherein said unsaturated monocarboxylic acid is acrylic acid or methacrylic acid.

12. An adhesive agent according to claim 1, wherein said epoxy compound is at least one member selected from the group consisting of polyglycidyl ether and polyglycidyl ester, epoxidized olefins.

13. An adhesive agent according to claim 12, wherein said polyglycidyl ethers obtained by the reaction of polyphenols such as bisphenol A, halogenated bisphenol A's, bisphenol F, catechol, novolak, and resorcinol, and polyhydric alcohols such as alkylene glycols, glycerol, trimethylol propane, and pentaerythritol with epichlorohydrin.

* * * * *